United States Patent
Evans

(10) Patent No.: US 10,202,092 B1
(45) Date of Patent: Feb. 12, 2019

(54) VEHICLE ALARM SYSTEM

(71) Applicant: Adrain Evans, Mesquite, TX (US)

(72) Inventor: Adrain Evans, Mesquite, TX (US)

( * ) Notice: Subject to any disclaimer, the term of this patent is extended or adjusted under 35 U.S.C. 154(b) by 0 days.

(21) Appl. No.: 15/672,881

(22) Filed: Aug. 9, 2017

(51) Int. Cl.
*B60R 21/015* (2006.01)
*B60N 2/00* (2006.01)

(52) U.S. Cl.
CPC ........ B60R 21/01532 (2014.10); B60N 2/002 (2013.01)

(58) Field of Classification Search
CPC ........ B60R 21/01512–21/01552; B60N 2/002
See application file for complete search history.

(56) References Cited

U.S. PATENT DOCUMENTS

| | | | |
|---|---|---|---|
| D452,833 S | 1/2002 | Ito et al. | |
| 6,714,132 B2 | 3/2004 | Edwards et al. | |
| 6,922,147 B1 | 7/2005 | Viksnins et al. | |
| 7,009,522 B2 | 3/2006 | Flanagan et al. | |
| 7,170,401 B1 * | 1/2007 | Cole | B60N 2/002 340/439 |
| 7,218,218 B1 | 5/2007 | Rogers | |
| 7,542,836 B1 * | 6/2009 | Norton | B60R 21/01532 280/728.1 |
| 7,592,905 B2 | 9/2009 | Barton et al. | |
| 8,063,788 B1 | 11/2011 | Morningstar | |
| D650,715 S | 12/2011 | Hill et al. | |
| 9,545,856 B2 * | 1/2017 | Borgne | B60N 2/26 |

FOREIGN PATENT DOCUMENTS

WO    WO2015107485    7/2015

* cited by examiner

*Primary Examiner* — Ryan Sherwin

(57) ABSTRACT

A vehicle alarm system for inhibiting a passenger from being left in a vehicle includes a vehicle has a processor, a pair of rear seats, a theft alarm and door locks. The processor selectively generates an alarm sequence and the processor is electrically coupled to the theft alarm and the door locks. A plurality of pressure sensors is each positioned within an associated one of the rear seats. Each of the pressure sensors detects when a passenger is seated in the associated rear seat. The processor generates the alarm sequence when the vehicle is turned off and at least one of the pressure sensors detects the passenger in the associated rear seat. Moreover, the theft alarm is turned on when the processor generates the alarm sequence to alert that at least one passenger remains in the vehicle thereby inhibiting the passenger from is injured by heat exposure.

5 Claims, 5 Drawing Sheets

VEHICLE ALARM SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to alarm devices and more particularly pertains to a new alarm device for inhibiting a passenger from being left in a vehicle.

BRIEF SUMMARY OF THE INVENTION

An embodiment of the disclosure meets the needs presented above by generally comprising a vehicle has a processor, a pair of rear seats, a theft alarm and door locks. The processor selectively generates an alarm sequence and the processor is electrically coupled to the theft alarm and the door locks. A plurality of pressure sensors is each positioned within an associated one of the rear seats. Each of the pressure sensors detects when a passenger is seated in the associated rear seat. The processor generates the alarm sequence when the vehicle is turned off and at least one of the pressure sensors detects the passenger in the associated rear seat. Moreover, the theft alarm is turned on when the processor generates the alarm sequence to alert that at least one passenger remains in the vehicle thereby inhibiting the passenger from is injured by heat exposure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
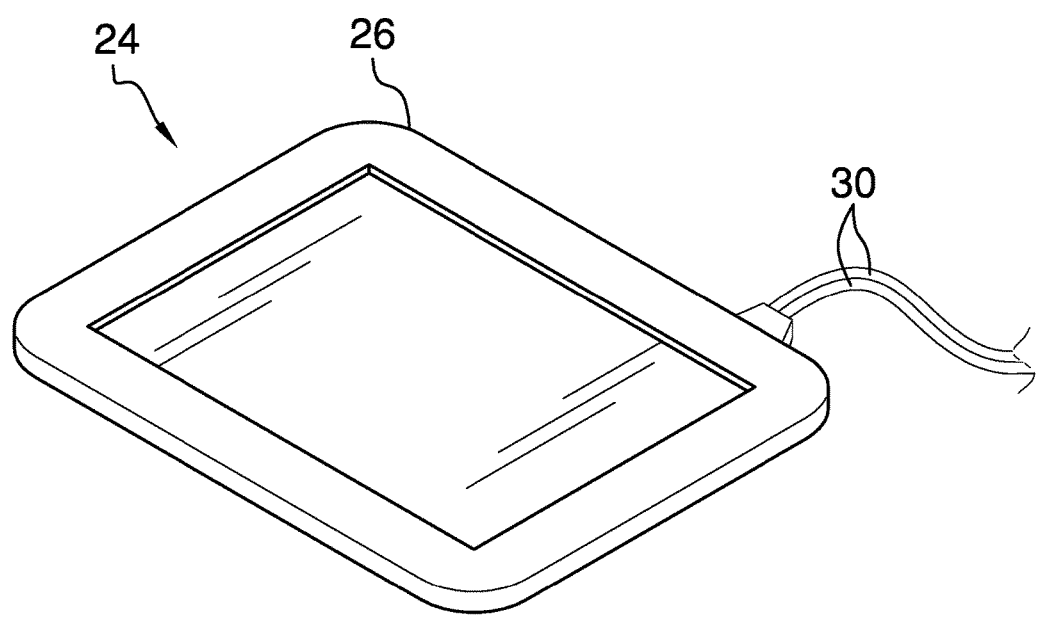
FIG. 1 is a top perspective view of a pressure sensor of a vehicle alarm system according to an embodiment of the disclosure.
Figure 2:
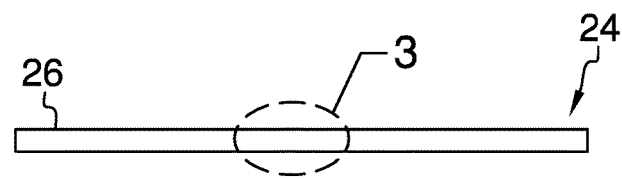
FIG. 2 is a front view of a pressure sensor of an embodiment of the disclosure.
Figure 3:
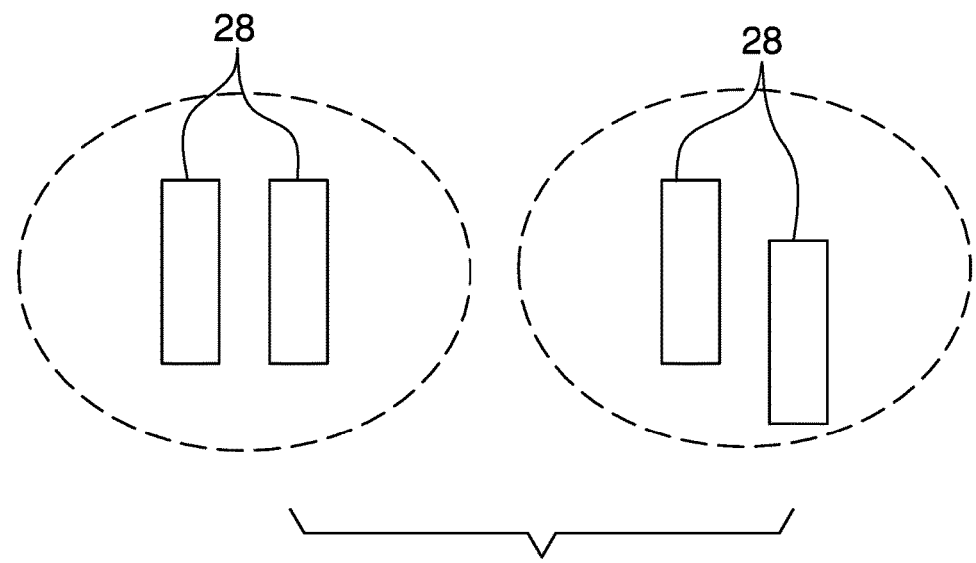
FIG. 3 is a detail view taken from circle 3 of FIG. 2 of an embodiment of the disclosure.
Figure 4:
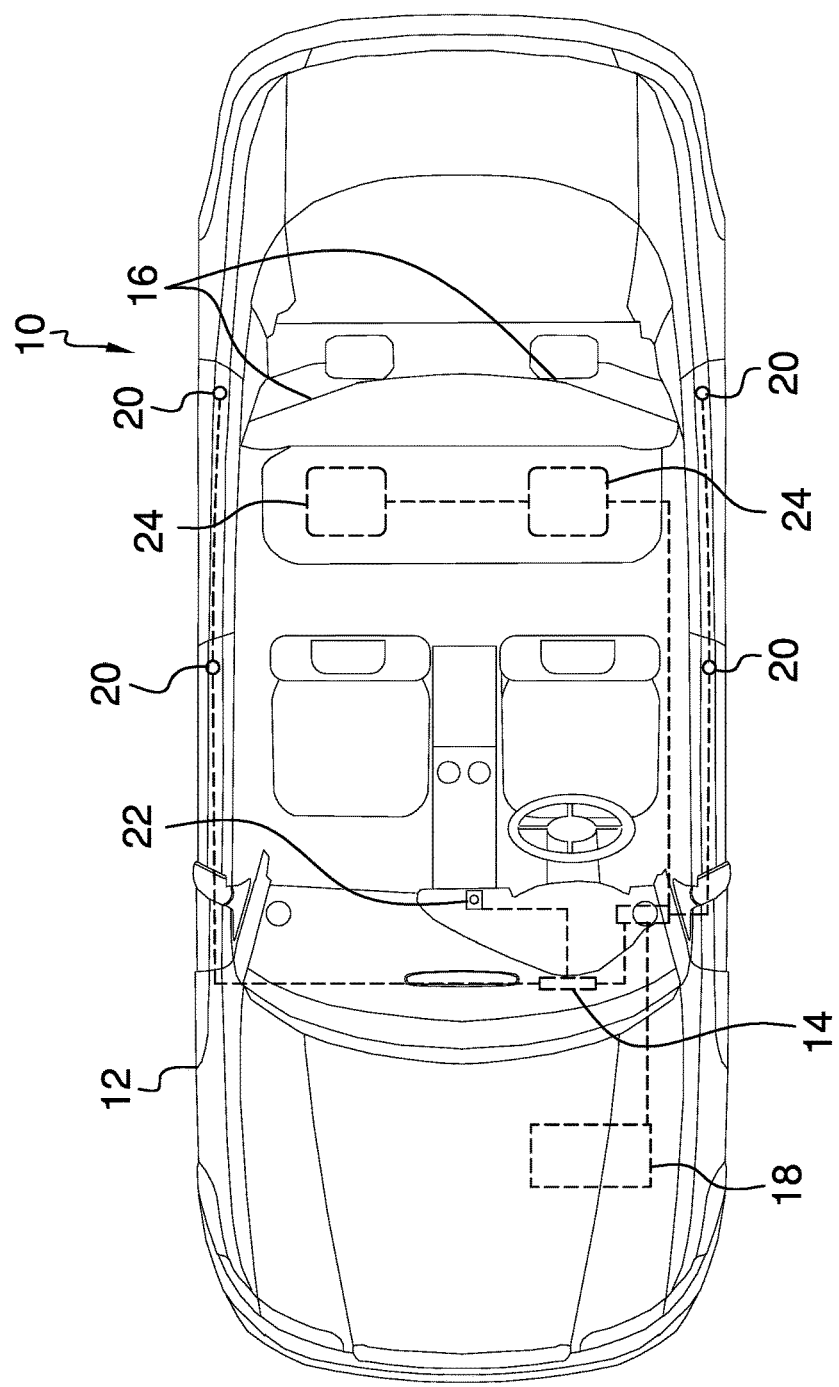
FIG. 4 is a perspective in-use view of an embodiment of the disclosure.
Figure 5:
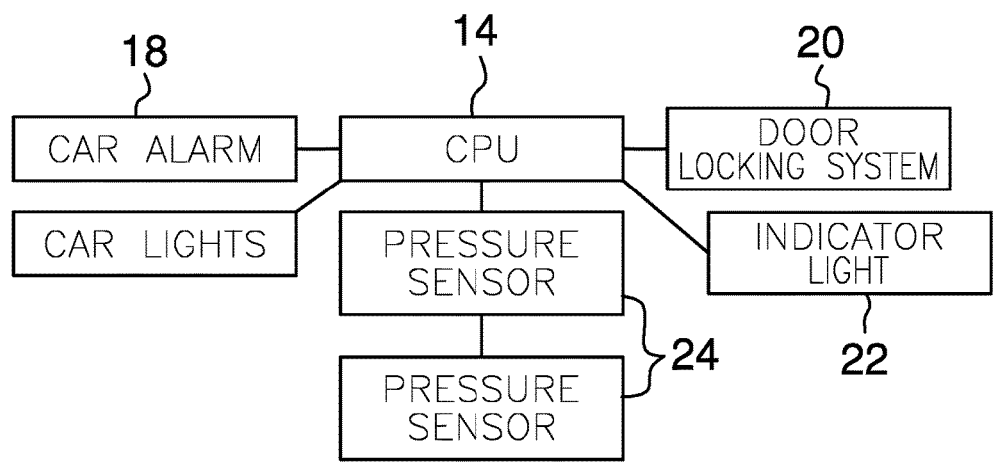
FIG. 5 is a schematic view of an embodiment of the disclosure.
Figure 6:
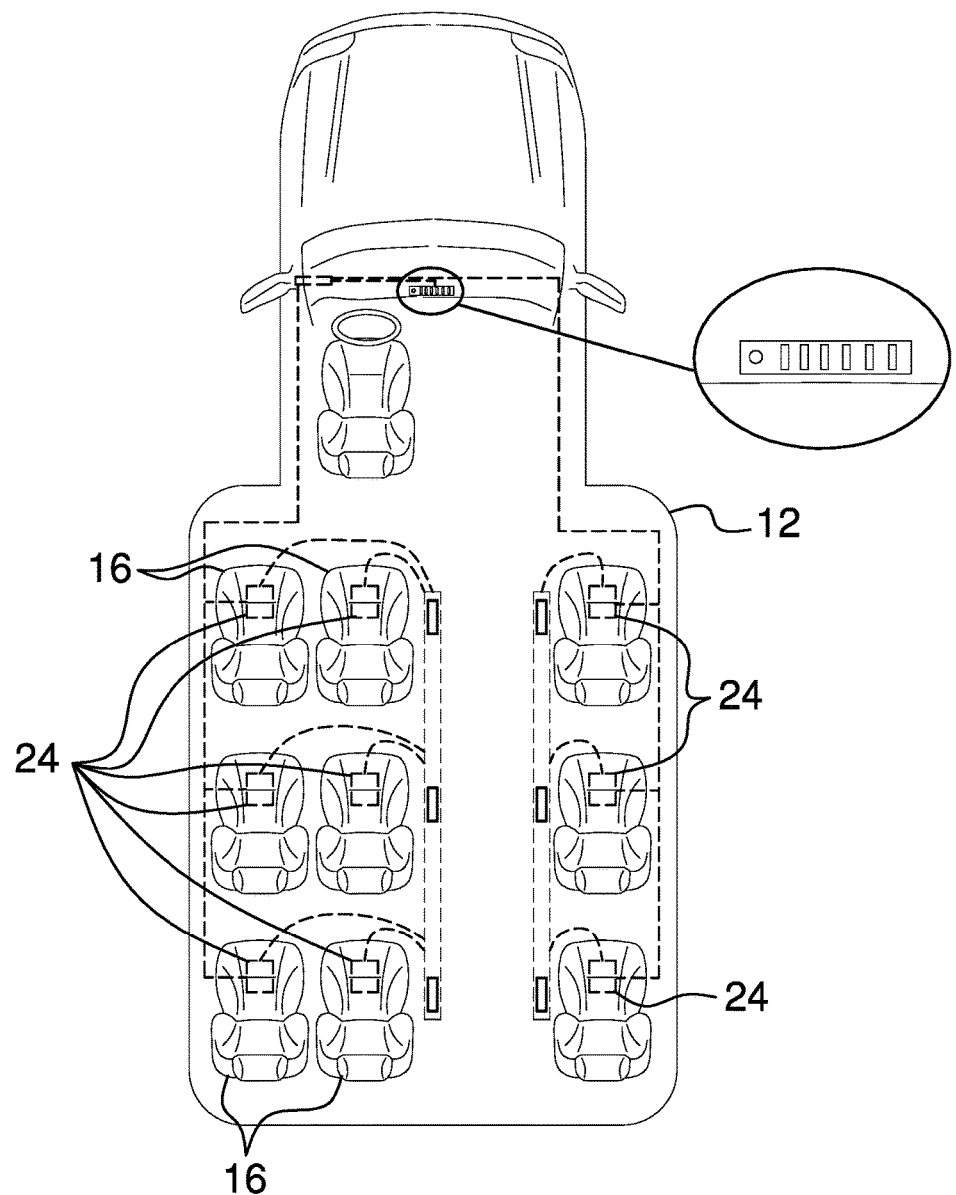
FIG. 6 is a perspective view of an alternative embodiment of the disclosure.

With reference now to the drawings, and in particular to FIGS. 1 through 6 thereof, a new alarm device embodying the principles and concepts of an embodiment of the disclosure and generally designated by the reference numeral 10 will be described.

As best illustrated in FIGS. 1 through 6, the vehicle alarm system 10 generally comprises a vehicle 12 that has a processor 14, a pair of rear seats 16, a theft alarm 18, door locks 20 and an indicator light 22. The indicator light 22 may be positioned on a dashboard in the vehicle 12. The processor 14 selectively generates an alarm sequence. The processor 14 is electrically coupled to the theft alarm 18, the indicator light 22 and the door locks 20. The vehicle 12 may be a private passenger vehicle such as a car or the like. Additionally, the vehicle 12 may be a commercial passenger vehicle such as a bus or the like. The processor 14 may be an integral component of the vehicle's 12 electrical system.

A plurality of pressure sensors 24 is provided and each of the pressure sensors 24 is positioned within an associated one of the rear seats 16. Each of the pressure sensors 24 detect when a passenger is seated in the associated rear seat 16. The passenger may be a child, a physically disabled adult and other passenger that needs assistance to care for themselves. Moreover, each of the pressure sensors 24 is electrically coupled to the processor 14. The processor 14 generates the alarm sequence when the vehicle 12 is turned off and at least one of the pressure sensors 24 detects the passenger in the associated rear seat 16.

The theft alarm 18 is turned on when the processor 14 generates the alarm sequence to alert that at least one passenger remains in the vehicle 12. In this way the theft alarm 18 inhibits the passenger from being injured by heat exposure. Additionally, the processor 14 inhibits the door locks 20 from locking when the processor 14 generates the alarm sequence. Thus, the processor 14 facilitates the passenger to exit the vehicle 12. The indicator light 22 is turned on when the processor 14 generates the alarm sequence in the vehicle 12. In this way the indicator light 22 facilitates a visual alert that the passenger has been left in the vehicle 12. The processor 14 may turn on the vehicle's 12 exterior lights when the processor 12 generates the alarm sequence in a vehicle 12 that does not have a theft alarm.

Each of the pressure sensors 24 comprise a housing 26 that is positioned within the associated rear seat. A pair of plates 28 is movably positioned in the housing 26. Each of the plates 28 may be comprised of an electrically conductive material. Additionally, each of the plates 28 is biased to be offset with each other.

Each of the plates 28 is urged into alignment with each other when the housing 26 is exposed to pressure thereby completing a circuit between the plates 28. The plates 28 may be biased away from each other with a spring or the like. The housing 26 may be comprised of a resiliently deformable material such that the housing 26 deforms when the housing 26 is exposed to the weight of the passenger. Each of the plates 28 may be in mechanical communication with the housing 26 such that the plates 28. Thus, the housing 26 may urge each of the plates 28 toward each other when the housing 26 is compressed. Additionally, each of the pressure sensors 24 may be electronic pressure sensors 24 of any conventional design.

A plurality of conductors 30 is provided and each of the conductors 30 is coupled between the housing 26 and the vehicle 12. Each of the conductors 30 is electrically coupled to an associated one of the plates 28. Additionally, each of the conductors 30 is electrically coupled to the processor 14. In this way the processor 14 generating the alarm sequence when the plates 28 are aligned with each other. Each of the pressure sensors 24 and the conductors 30 may be unitary structures with respect to the vehicle 12.

In use, each of the pressure sensors 24 detects the weight of the passenger when the passenger is seated in one of the rear seats 16. The processor 14 generates the alarm sequence when the vehicle ignition is turned off and at least one of the pressure sensors 24 detects the passenger. Thus, the theft alarm 18 is turned on the alert that the passenger has been left in the vehicle 12. In this way the theft alarm 18 inhibits the passenger from being injured or killed by heat exposure. Additionally, the door locks 20 are inhibited from locking when the processor 14 generates the alarm sequence. Thus, the passenger may be removed from the vehicle 12 when the processor 14 generates the alarm sequence.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle alarm system being configured to emit an audible alarm when a passenger is left in a vehicle when the vehicle is turned off, said system comprising:

a vehicle having a processor, a pair of rear seats, a theft alarm and door locks, said processor selectively generating an alarm sequence, said processor being electrically coupled to said theft alarm and said door locks; and a plurality of pressure sensors, each of said pressure sensors being positioned within an associated one of said rear seats wherein each of said pressure sensors is configured to detect when a passenger is seated in the associated rear seat, said processor generating said alarm sequence when said vehicle is turned off and at least one of said pressure sensors detects the passenger in said associated rear seat, said theft alarm being turned on when said processor generates said alarm sequence wherein said theft alarm is configured to alert that at least one passenger remains in said vehicle thereby inhibiting the passenger from being injured by heat exposure, each of said pressure sensors includes:

a housing being positioned within said associated rear seat, and a pair of plates, each of said plates being movably positioned within said housing, each of said plates being laterally spaced apart, vertically oriented, and biased to be offset vertically with respect to each other, each of said plates is vertically urged into horizontal alignment with each other when said housing is exposed to pressure thereby completing a circuit between said plates.

2. The system according to claim 1, wherein each of said pressure sensors is electrically coupled to said processor.

3. The system according to claim 1, wherein said processor inhibits said door locks from locking when said processor generates said alarm sequence wherein said processor is configured to facilitate the passenger to exit said vehicle.

4. The system according to claim 1, further comprising a plurality of conductors, each of said conductors being coupled between said housing and said vehicle, each of said conductors being electrically coupled to an associated one of said plates, each of said conductors being electrically coupled to said processor, said processor generating said alarm sequence when said plates are aligned with each other.

5. A vehicle alarm system being configured to emit an audible alarm when a passenger is left in a vehicle when the vehicle is turned off, said system comprising:

a vehicle having a processor, a pair of rear seats, a theft alarm and door locks, said processor selectively generating an alarm sequence, said processor being electrically coupled to said theft alarm and said door locks; and a plurality of pressure sensors, each of said pressure sensors being positioned within an associated one of said rear seats wherein each of said pressure sensors is configured to detect when a passenger is seated in the associated rear seat, each of said pressure sensors being electrically coupled to said processor, said processor generating said alarm sequence when said vehicle is turned off and at least one of said pressure sensors detects the passenger in said associated rear seat, said theft alarm being turned on when said processor generates said alarm sequence wherein said theft alarm is configured to alert that at least one passenger remains in said vehicle thereby inhibiting the passenger from being injured by heat exposure, said processor inhibiting said door locks from locking when said processor generates said alarm sequence wherein said processor is configured to facilitate the passenger to exit said vehicle, each of said pressure sensors comprising:

a housing being positioned within said associated rear seat, a pair of plates, each of said plates being movably positioned within said housing, each of said plates being laterally spaced apart, vertically oriented, and biased to be offset vertically with respect to each other, each of said plates being vertically urged into horizontal alignment with each other when said housing is exposed to pressure thereby completing a circuit between said plates, and a plurality of conductors, each of said conductors being coupled between said housing and said vehicle, each of said conductors being electrically coupled to an associated one of said plates, each of said conductors being electrically coupled to said processor, said processor generating said alarm sequence when said plates are aligned with each other.

\* \* \* \* \*